(12) United States Patent
Hazani

(10) Patent No.: US 12,149,502 B2
(45) Date of Patent: Nov. 19, 2024

(54) AUTOMATIC ADDRESSING PROCESS FOR DEVICES ON A SERIAL BUS

(71) Applicant: CORNING RESEARCH & DEVELOPMENT CORPORATION, Corning, NY (US)

(72) Inventor: Ami Hazani, Raanana (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 48 days.

(21) Appl. No.: 18/071,771

(22) Filed: Nov. 30, 2022

(65) Prior Publication Data

US 2024/0179119 A1 May 30, 2024

(51) Int. Cl.
*H04L 61/5038* (2022.01)
*H02J 13/00* (2006.01)
(Continued)

(52) U.S. Cl.
CPC .... *H04L 61/5038* (2022.05); *H02J 13/00016* (2020.01); *H04L 12/10* (2013.01); *H04L 12/40* (2013.01)

(58) Field of Classification Search
CPC ..... H04L 61/5038; H04L 12/10; H04L 12/40; H02J 13/00016
(Continued)

(56) References Cited

U.S. PATENT DOCUMENTS 5,610,872 A * 3/1997 Toda .................... G11C 11/4096
365/189.11
8,639,459 B1 * 1/2014 Morales ................ G01R 21/00
702/62

(Continued)

FOREIGN PATENT DOCUMENTS

CN 108737590 B 2/2022
CN 110417930 B 2/2022
(Continued)

OTHER PUBLICATIONS

"ECC800 Data Center Controller User Manual (SmartDC V100R021C10)", Retreived from: https://support.huawei.com/enterprise/en/doc/EDOC1100181760/ae911c7e/uim20a-expansion-module, Retreived on: Jan. 16, 2023.

*Primary Examiner* — Idriss N Alrobaye
*Assistant Examiner* — Henry W Yu
(74) *Attorney, Agent, or Firm* — William D. Doyle

(57) ABSTRACT

An automatic addressing process for devices on a serial bus is disclosed. In one aspect, a controller is communicatively coupled to multiple power supply units (PSUs) over a serial bus. At installation (and may be at start up or reset), the controller sends a signal through the serial bus to a first PSU, which adopts a first address based on a voltage level of the signal and increases the voltage level before passing the signal to a second PSU. The second PSU adopts an address based on the increased voltage level, increments the voltage level of the signal and passes the signal down the bus. Adopted addresses are written to memory and stored in such a manner that power loss will not erase the address. This stepped voltage signal allows multiple identical PSUs to be addressed without reliance on manually-changed dip switches, separate address negotiation software, or the like.

36 Claims, 9 Drawing Sheets

(51) Int. Cl.
*H04L 12/10* (2006.01)
*H04L 12/40* (2006.01)

(58) Field of Classification Search
USPC .............................. 710/3, 9, 20, 62, 104, 110
See application file for complete search history.

(56) References Cited

U.S. PATENT DOCUMENTS

| | | | | |
|---|---|---|---|---|
| 8,766,842 | B1* | 7/2014 | Bertolini | H03M 1/56 341/158 |
| 2002/0035659 | A1* | 3/2002 | Kelly | G06F 13/409 710/317 |
| 2007/0052457 | A1* | 3/2007 | Thewes | H03K 23/425 327/115 |
| 2011/0047398 | A1* | 2/2011 | Koizumi | G06F 1/266 713/330 |
| 2011/0185093 | A1* | 7/2011 | Matsuo | H04L 12/403 710/110 |
| 2012/0212065 | A1* | 8/2012 | Cheng | H02J 3/46 363/95 |
| 2013/0282941 | A1* | 10/2013 | van Dijk | H04L 61/5038 710/110 |
| 2017/0093205 | A1* | 3/2017 | Banno | H02M 1/32 |

FOREIGN PATENT DOCUMENTS

| | | | | |
|---|---|---|---|---|
| CN | 114039950 A | | 2/2022 | |
| EP | 2857698 A1 | * | 4/2015 | .......... F15B 13/0867 |

* cited by examiner

AUTOMATIC ADDRESSING PROCESS FOR DEVICES ON A SERIAL BUS

BACKGROUND

The technology of the disclosure relates generally to a process for assigning addresses to devices in a power distribution network (PDN).

Electrical devices require power. In many instances, the power may be provided by a battery or a local power source such as a wall outlet or the like. However, in some instances, it may be inconvenient to supply power through a wall outlet or a battery. For example, the power demands or voltage levels of the device being powered may exceed that which is available through the conventional wall outlets (e.g., the item may need 340 Volts (V) instead of the conventional 110 V supplied by most U.S. power outlets). Or, the device may consume sufficient power that battery supplies are impractical. Likewise, the location may be such that a local power supply is not available. In such instances, there may be a dedicated PDN associated with such devices.

A few exemplary systems that may have associated PDNs include, but are not limited to, server farms, lighting systems, and distributed communication systems (DCSs) such as a distributed antenna system (DAS) or radio access network (RAN). Such systems may have a central power source and one or more power conductors that convey power from the power source to one or more remote sub-units (e.g., a server, a lighting fixture, a remote antenna unit, or the like).

Commercial pressure has caused movement from large monolithic power supply units (PSUs) having multiple ports (e.g., 16 or 32 ports) that supply power to multiple remote units to smaller more modular PSUs with a flexible number of managed powering ports. Communication to these smaller PSUs may be done over external communication cables such as a CAT 5 cable that runs RS485 communication. In such an instance, each PSU needs an address by which communication may be sent to a given PSU.

No admission is made that any reference cited herein constitutes prior art. Applicant expressly reserves the right to challenge the accuracy and pertinency of any cited documents.

SUMMARY

Aspects disclosed in the detailed description include an automatic addressing process for devices on a serial bus, such as, for example, in a power distribution network (PDN). In particular, aspects of the present disclosure contemplate using a controller communicatively coupled to multiple power supply units (PSUs) over a serial bus. At installation (and may be at start up or reset), the controller sends a signal through the serial bus to a first PSU, which adopts a first address based on a voltage level of the signal and increases the voltage level before passing the signal to a second PSU. The second PSU adopts an address based on the increased voltage level, increments the voltage level of the signal and passes the signal down the bus. Adopted addresses are written to memory and stored in such a manner that power loss will not erase the address. This stepped voltage signal allows multiple identical PSUs to be addressed without reliance on manually-changed dip switches, production pre-configuration, separate address negotiation software, or the like.

In this regard in one aspect, a method for assigning addresses to PSUs in a PDN is disclosed. The method comprises, from a host, sending a voltage signal at a first voltage level to a first PSU. The method also comprises, at the first PSU, determining an address from the first voltage level. The method also comprises, from the first PSU, sending a second voltage signal at a second higher voltage level to a downstream PSU. The method also comprises, at the downstream PSU, determining a second address from the second higher voltage level, In another aspect, a PSU is disclosed. The PSU comprises an upstream input/output (I/O) interface. The PSU also comprises a downstream I/O interface. The PSU also comprises a control circuit communicatively coupled to the upstream I/O interface and the downstream I/O interface. The control circuit is configured to receive a first signal from the upstream I/O interface. The control circuit is also configured to determine an address from the first signal. The control circuit is also configured to increment the first signal to a second signal. The control circuit is also configured to send the second signal through the downstream I/O interface.

In another aspect, a method for assigning addresses to end devices in a distributed network of devices is disclosed. The method comprises, from a host, sending a voltage signal at a first voltage level to a first end device. The method also comprises, at the first end device, determining an address from the first voltage level. The method also comprises, from the first end device, sending a second voltage signal at a second higher voltage level to a downstream end device. The method also comprises, at the downstream end device, determining a second address from the second higher voltage level.

In another aspect, an end device is disclosed. The end device comprises an upstream I/O interface. The end device also comprises a downstream I/O interface. The end device also comprises a control circuit communicatively coupled to the upstream I/O interface and the downstream I/O interface. The control circuit is configured to receive a first signal from the upstream I/O interface. The control circuit is also configured to determine an address from the first signal. The control circuit is also configured to increment the first signal to a second signal. The control circuit is also configured to send the second signal through the downstream I/O interface.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Aspects disclosed in the detailed description include an automatic addressing process for devices on a serial bus, such as, for example, in a power distribution network (PDN). In particular, aspects of the present disclosure contemplate using a controller communicatively coupled to multiple power supply units (PSUs) over a serial bus. At installation (and may be at start up or reset), the controller sends a signal through the serial bus to a first PSU, which adopts a first address based on a voltage level of the signal and increases the voltage level before passing the signal to a second PSU. The second PSU adopts an address based on the increased voltage level, increments the voltage level of the signal and passes the signal down the bus. Adopted addresses are written to memory and stored in such a manner that power loss will not erase the address. This stepped voltage signal allows multiple identical PSUs to be addressed without reliance on manually-changed dip switches, production pre-configuration, separate address negotiation software, or the like.

While the present disclosure may be used in a variety of PDNs, a PDN rarely exists in isolation. Rather, a PDN provides infrastructure to some other system, a few of which are briefly discussed with reference to FIGS. 1-3. A discussion of exemplary aspects of the present disclosure begins below with reference to FIG. 4.

Figure 1:
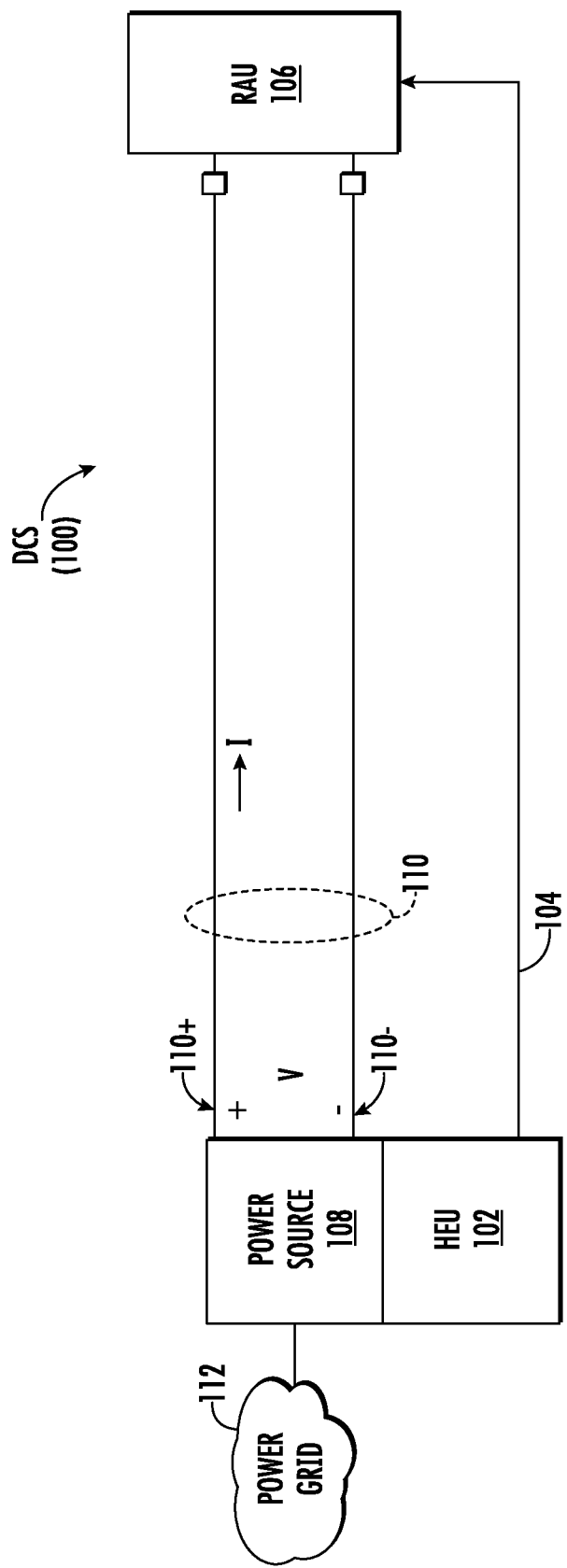
FIG. 1 is a schematic diagram of an exemplary power distribution network (PDN) for a distributed communication system (DCS), where the PDN may have start-up protocols according to exemplary aspects of the present disclosure.

In this regard, FIG. 1 illustrates a simplified block diagram of a distributed communication system (DCS) 100. The DCS 100 may include a head end unit (HEU) 102 that communicates through a communication medium 104 with a remote antenna unit (RAU) 106. The communication medium 104 may be a wire-based or optical fiber medium. The RAU 106 includes a transceiver and an antenna (not illustrated) that communicate wirelessly with mobile terminals and other user equipment (also not illustrated). Because the RAU 106 sends and receives wireless signals and may potentially perform other functions, the RAU 106 consumes power. That power may, in some instances, be provided locally. More commonly, and of interest to the present disclosure, the DCS 100 includes a PDN, and the RAU 106 receives power from a power source or PSU 108 that transmits power to the RAU 106 over power lines 110 formed from a positive power line 110+ and a negative power line 110−. The power lines 110 may be many meters long, for example, extending through an office building, across multiple floors of a multi-story building, or the like. Further, the power lines 110 may couple to multiple RAUs 106 (even though only one is illustrated in FIG. 1). The PSU 108 may be coupled to an external power grid 112.

Figure 2:
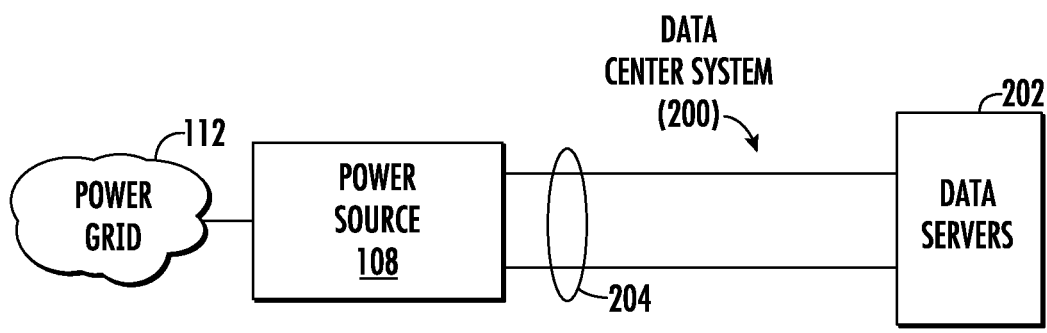
FIG. 2 is a schematic diagram of an exemplary PDN for a server farm, where the PDN may have start-up protocols according to exemplary aspects of the present disclosure.

Similarly, FIG. 2 illustrates a data center system 200 having a PSU 108 coupled to remote data servers 202 through power lines 204. The PSU 108 is coupled to the external power grid 112. As with the RAU 106, the remote data servers 202 may consume power supplied through the power lines 204.

Figure 3:
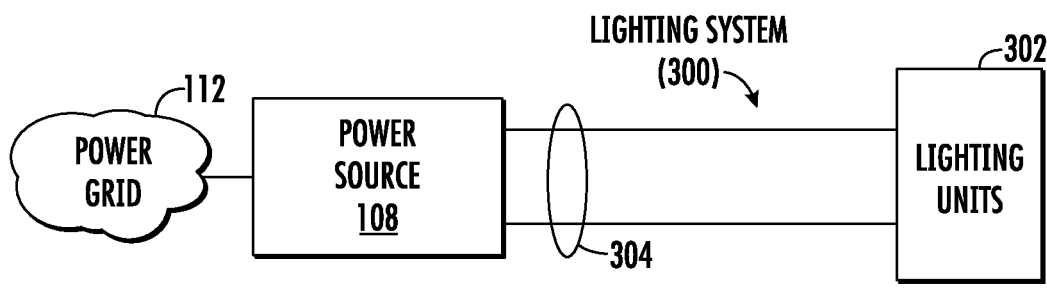
FIG. 3 is a schematic diagram of an exemplary PDN for a lighting system, where the PDN may have start-up protocols according to exemplary aspects of the present disclosure.

Similarly, FIG. 3 illustrates a lighting system 300 having a PSU 108 coupled to remote lighting units 302 through power lines 304. The PSU 108 is coupled to the external power grid 112. As with the RAU 106, the remote lighting units 302 may consume power supplied through the power lines 304.

It should be appreciated that there may be other contexts that may use a PDN, and the examples provided in FIGS. 1-3 are not intended to be limiting. As a note of nomenclature, the RAU 106, the remote data servers 202, and the remote lighting units 302 are remote sub-units. Note also that the PDN of FIGS. 1-3 corresponds to more historical configurations where there is a single PSU that is powerful enough to provide power to multiple remote sub-units. Emerging trends suggest that while such single monolithic PSUs are still of value, there is also a market for smaller PSUs that may only support one or a small number of remote sub-units. These smaller PSUs may be part of a larger PDN and may need to be controlled by a controller. This controller may need to send specific commands or messages to the different PSUs and accordingly needs a way to address such PSUs. In the past, the PSUs would potentially be manufactured with unique addresses which would have to be programmed into the controller. Alternatively, the PSUs may be equipped with dip switches, circuits requiring a jumper, or other mechanism that is set manually during installation. Such installation is prone to user error and adds to the expense of installation. Still another option is some form of software addressing scheme. Such software must then be maintained at additional expense and potentially, each updated version may need to be approved/qualified, which again adds to delay and expense.

Exemplary aspects of the present disclosure provide a way to assign addresses to multiple PSUs on a single serial bus without the need for manual setting of jumpers or dip switches, does not need software updates, and generally preserves the low-cost preference for such PSUs.

Figure 4:
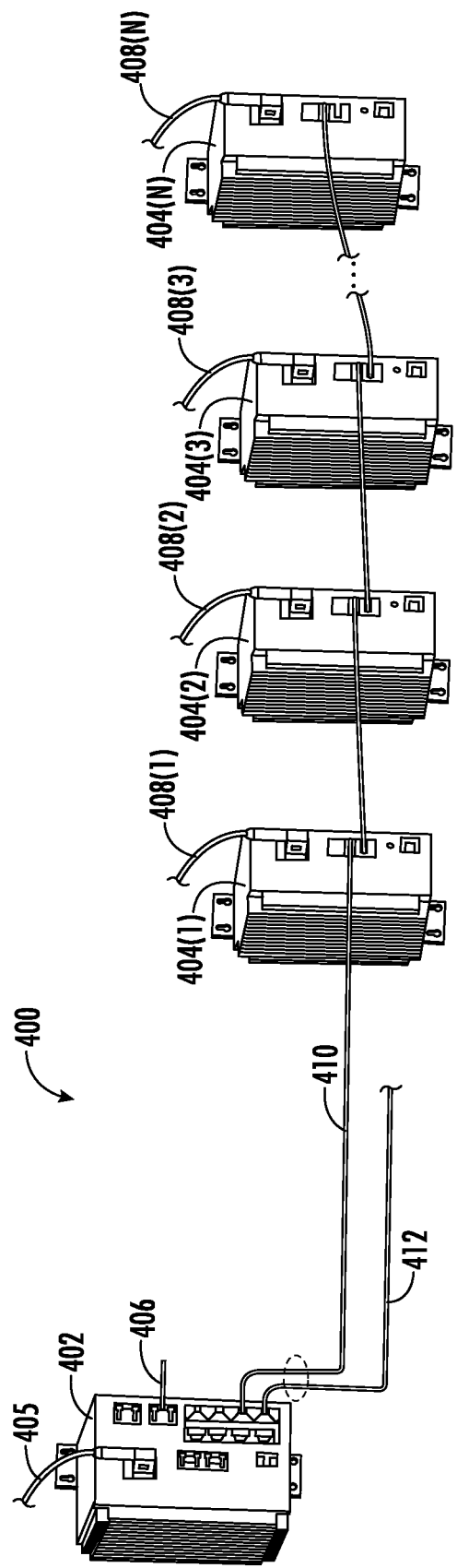
FIG. 4 is a simplified illustration of a PDN having multiple power supply units (PSUs) connected through a serial bus.

In this regard, FIG. 4 provides a diagram of a PDN 400 having a master controller 402 that is coupled to multiple PSUs 404(1)-404(N). It is appreciated that the term "master" is sometimes not favored and equivalently may also be considered a "host." Likewise, while the PSUs 404(1)-404(N) may be considered slaves, they may also be referred to as followers or the like. Power may be provided to the master controller 402 through a power cord 405 and distributed through a power line 406. Different ones of the PSUs 404(1)-404(N) may receive power through power lines 408(1)-408(N), one or more of which may be the power line 406. Other power lines (not shown explicitly) may also interconnect the master controller 402 to the PSUs 404(1)-404(N). Likewise, the power lines 408(1)-408(N) may not couple to the master controller 402 at all. The PSUs 404(1)-404(N) each include a power output (not shown explicitly) that is configured to supply power to one or more remote units.

The master controller 402 is communicatively coupled to the PSUs 404(1)-404(N) through a serial communication bus 410, which, in an exemplary aspect is a CAT 5 cable carrying RS485 communication and may contain synchronization and/or control signals. While CAT 5 is specifically contemplated, other types of cables, commercially available or custom created, may be used. The PSUs 404(1)-40(N) are cascaded on the serial communication bus 410. That is, the first PSU 404(1) is coupled directly in an upstream direction to the master controller 402; the second PSU 404(2) is coupled in an upstream direction to the first PSU 404(1) and in a downstream direction to the third PSU 404(3); the third PSU 404(3) is coupled in an upstream direction to the second PSU 404(2) and in a downstream direction to the fourth PSU 404(4) (not shown) and so on until the last PSU 404(N). Optionally, the cascade may be looped back to the master controller 402 to form a daisy chain, but such is not required and not shown.

Note also that in addition to various cabling protocols (e.g., RS485 or other protocols), the present disclosure could be adapted to a wireless and/or Internet of Things (IoT) environment. In the event of a wireless communication link, the addressing could still be cascaded with at least two wires (addressing and a return or ground wire).

Additional PSUs (not shown) may be communicatively coupled to the master controller 402 through a second (or more) serial communication bus 412.

Figure 5:
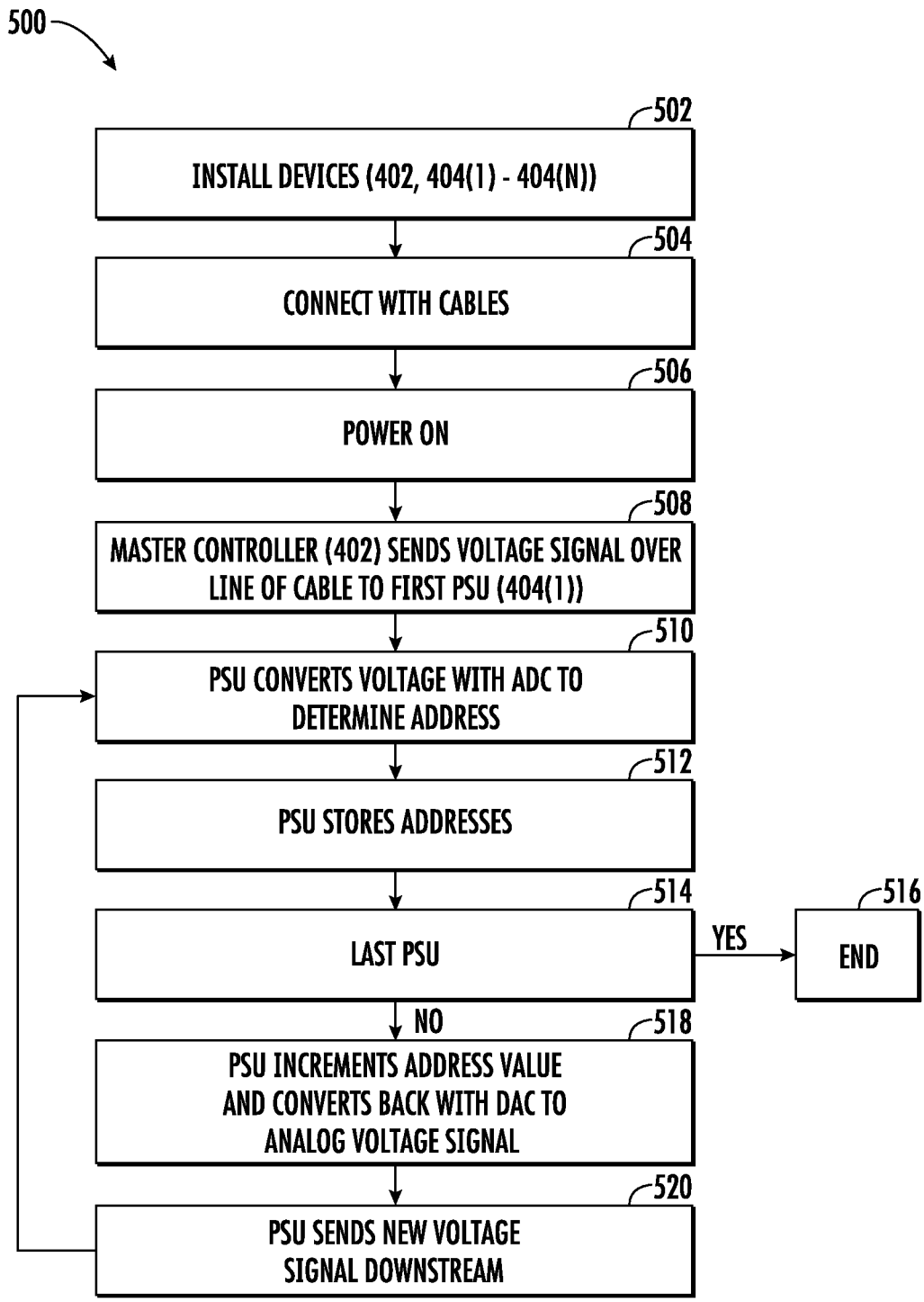
FIG. 5 is a flowchart illustrating an exemplary process for addressing PSUs in the PDN of FIG. 4 according to aspects of the present disclosure.

Having coupled the PSUs 404(1)-404(N) to the master controller 402, exemplary aspects of the present disclosure use a voltage signal on the serial communication bus 410 to assign addresses to the different PSUs 404(1)-404(N). The PSUs 404(1)-404(N) may then store the addresses in memory and subsequently use those addresses when communicating. This process 500 is illustrated by a flowchart in FIG. 5.

In this regard, the process 500 begins with the installation of the devices 402, 404(1)-404(N) and any other devices in the system (block 502). The devices 402, 404(1)-404(N) are coupled with appropriate cables (block 504), such as the CAT 5 cables previously discussed. The power of the system is turned on (block 506). The master controller 402 sends a voltage signal at a first level over a line of the cable to a first PSU 404(1) (block 508). In an exemplary aspect, this first level is zero volts (0 V) or 1 V.

At the first PSU 404(1), the PSU 404(1) may use an analog-to-digital converter (ADC) to determine an address from the voltage signal (block 510). For example, the voltage signal may initially arrive as an analog voltage signal and be converted to the digital domain, with the digital value thereof corresponding to an address. The PSU 404(1) stores the address in a memory (block 512) and determines if it is the last PSU 404(N) (block 514). If the answer is yes, then the process 500 ends (block 516). In an exemplary aspect, the last PSU detection is done by sensing current on the addressing output signal. If there is no next PSU, there is no current sensed. Alternatively, a power bus can also be monitored if there is an integrated power bus. If, however, the PSU is not the last PSU, then the PSU increments the address value and converts the new address value (which is in the digital domain) back to an analog voltage signal using a digital-to-analog converter (DAC) (block 518) and sends the new voltage signal downstream (block 520). The process 500 returns to block 510 where the next PSU converts the voltage signal to a value to determine the address.

Note that block 514 may not be an explicit determination. Rather, the PSU 404(N) may merely increment the voltage value and present the voltage at an output port, but since there is no cable attached to the output port, no downstream signal is transmitted. Note further, that while not shown, the PSU may send an acknowledgement signal (analogous to a reset signal or the like in the RS485 standard) on another line of the cable when the address is stored. Other forms of feedback from the slave (e.g., the PSU) to the master may be omitted. Note also that while an analog voltage signal is contemplated, a digital signal could be used instead, which would allow the elimination of the ADC and DAC, but would require extra lines in the cable (e.g., one line per address bit). In exemplary aspects, the change in voltage is 1 V each time, but need not be this value. Smaller values such as 0.7 V (or less) could be used. While larger values could also be used, depending on how large N is, the required voltages may grow larger than practical, but the present disclosure is not limited to a specific voltage increment.

As a further option, there may not necessarily be a memory to handle and store the addresses. Additionally, control circuits per se, but some form of dedicated integrated circuit (IC) may not be involved in the process of address identification or allocation, although the identified address is connected to control circuit input pins. For the purposes of this disclosure, such a dedicated IC is also considered a control circuit. The address lines are static, except for power on or after any sort of re-wiring. Any new identified address (or change in address) may cause the PSU to generate an addressing reset signal analogous to the reset signal mentioned above. Note that this reset signal may not originate in the control circuit.

As an alternative to the process 500, instead of using an analog addressing signal, a pulse train can run over a single wire similar to a pulse dialing mechanism such as used for analog Plain Old Telephone System (POTS) or a tone-based transmission such as Dual Tone Multi-Frequency (DTMF). Note that this sort of signaling may be periodic to avoid a need for feedback from the slave to the master and also to allow slaves to identify changes in configuration. As an aside, within the industry, "signaling" is generally not considered communication between units and this interpretation is adopted herein.

Figure 6A:
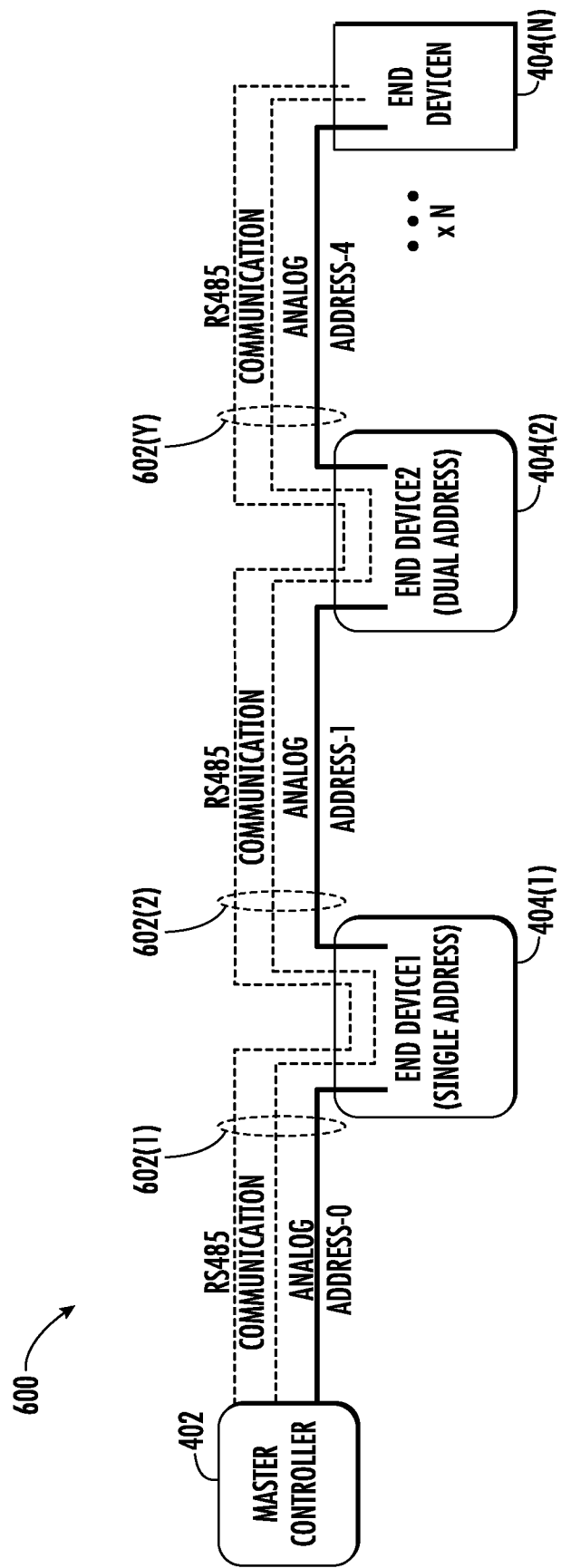
FIG. 6A is a schematic diagram illustrating a stepped voltage signal being used to address PSUs having single or multiple addresses.

FIG. 6A illustrates a system 600 with a master controller 402 coupled to a plurality of PSUs 404(1)-404(N) by cables 602(1)-602(Y). The line carrying the analog voltage signal for the addressing of the present disclosure is highlighted and distinct from the lines carrying other communication signals (e.g., the RS485 lines). While PSU 404(1) has a single control circuit and thus has a single address, there are PSUs which may have multiple control circuits and accordingly need multiple addresses. In this regard, PSU 404(2) as illustrated has two control circuits and thus two addresses as better illustrated in FIG. 6B, where the incoming signal in the address line is received and converted by an ADC 604 and passed to a control circuit 606. The address value is incremented by an increment circuit 608 and passed to a second control circuit 610. This incrementation may be done in the digital domain. The address value is incremented again by a second increment circuit 612 and then passed to a DAC 614 before passing back out on the next segment of cable. While two control circuits 606, 610 are shown in the PSU 404(2), more may be present. In such a case, each control circuit gets an incremented address. However, at some point there is a bit of diminishing returns for using the present disclosure for a PSU with many control circuits.

Figure 6B:
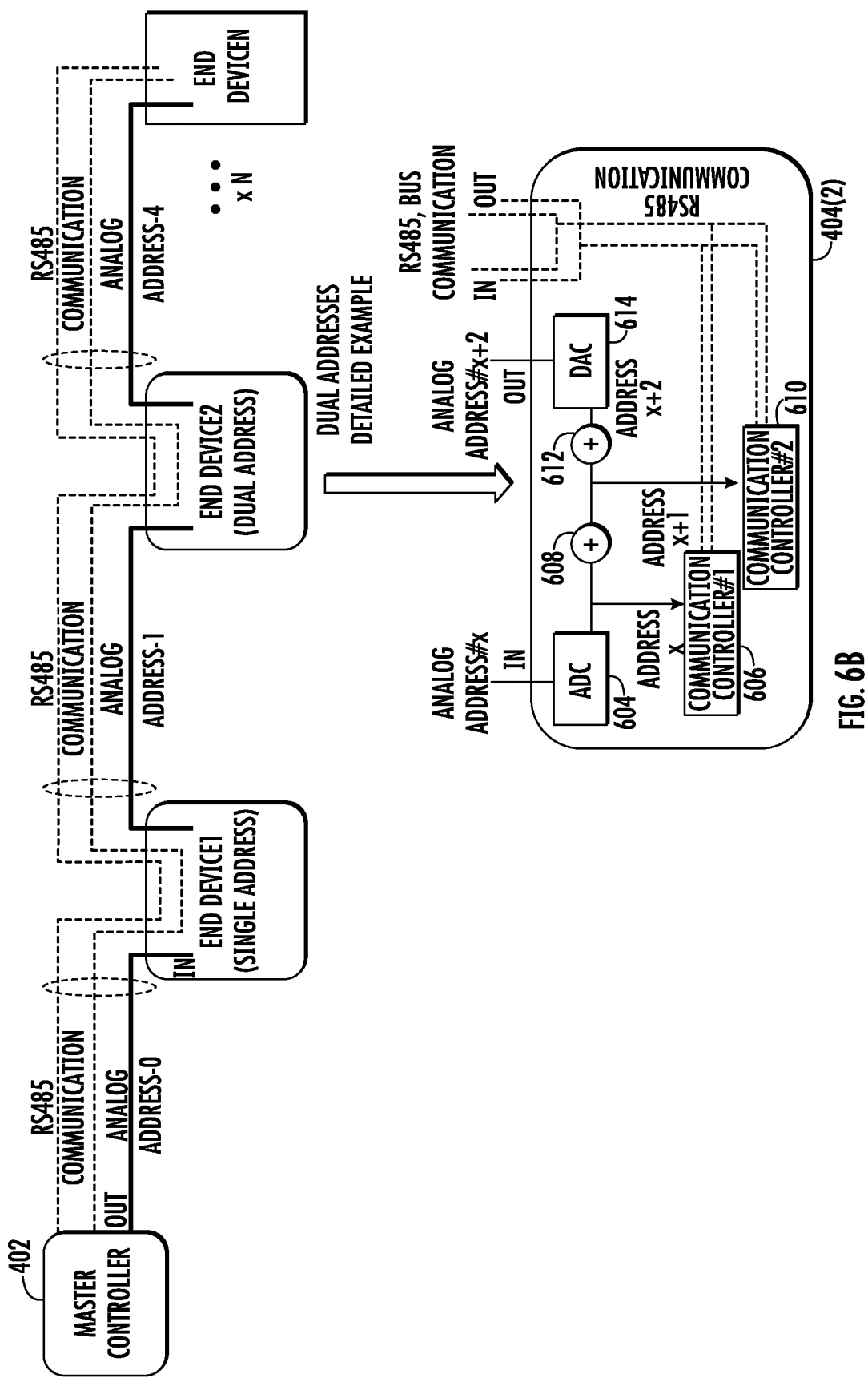
FIG. 6B is an illustration providing additional details about a PSU having multiple addresses.
Figure 7A:
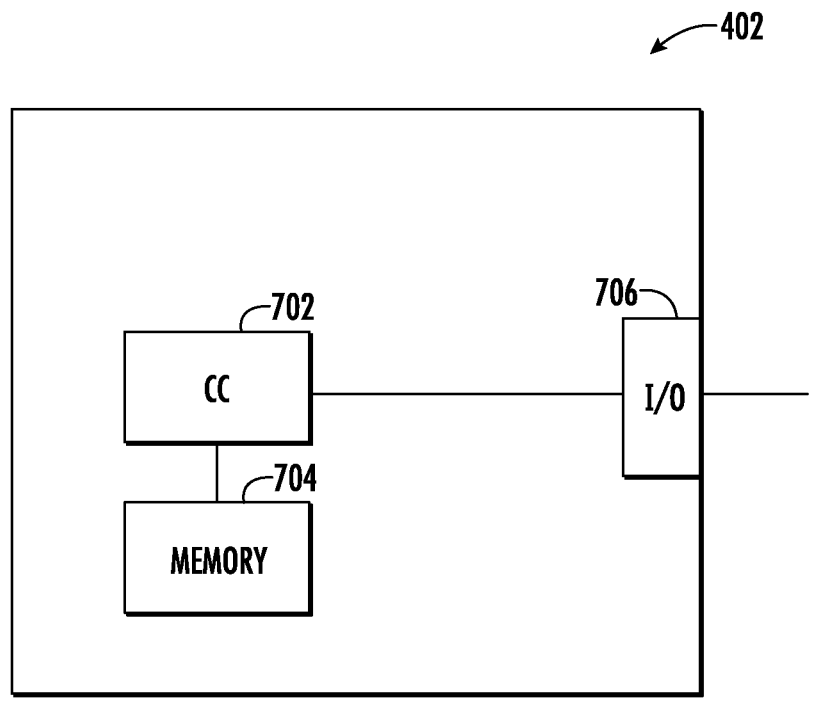
FIG. 7A is a block diagram of a host or master controller used in the PDN of FIG. 4.
Figure 7B:
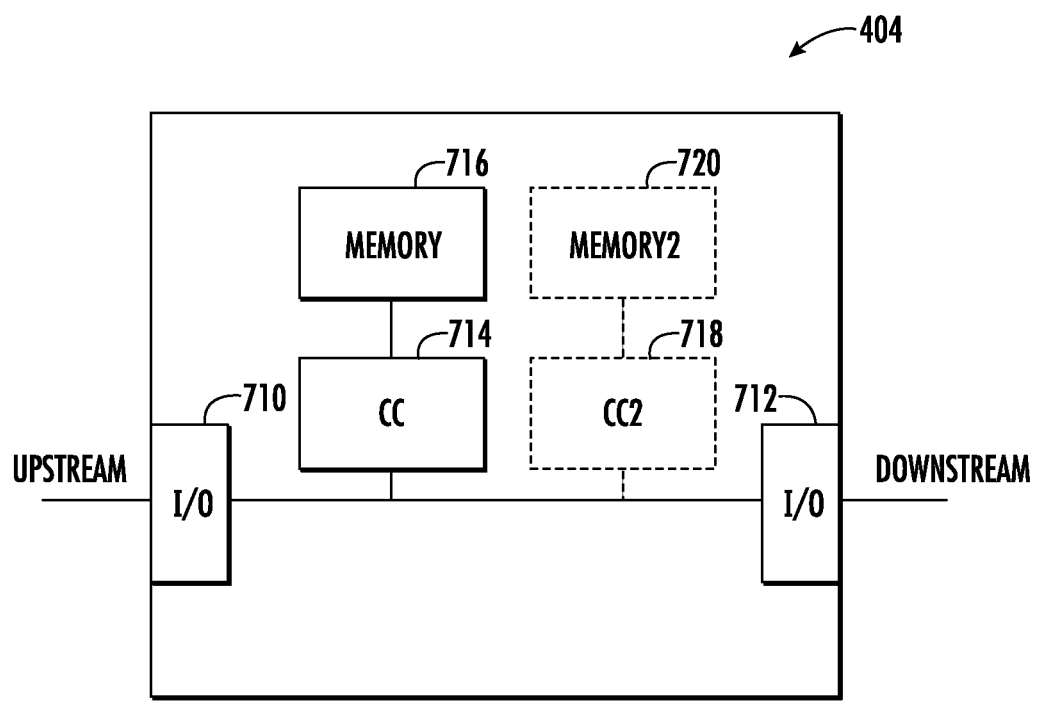
FIG. 7B is a block diagram of a PSU that may be used in the PDN of FIG. 4.

While partially illustrated in FIGS. 6A and 6B, some additional details are provided in FIGS. 7A and 7B for the master controller 402 and the PSU 404. Thus, in FIG. 7A, the master controller 402 may include a control circuit 702 and associated memory 704 along with an input/output (I/O) interface 706 that is configured to couple to the cable. The control circuit 702 may set the initial voltage level sent out over the cable to the first PSU 404(1) and receive any acknowledgement signals from PSUs 404(1)-404(N) as they accept their new address assignments.

As illustrated in FIG. 7B, a PSU 404 may include an upstream I/O interface 710 and a downstream I/O interface 712. Additionally, the PSU 404 may include a control circuit 714 analogous to the control circuit 606 of FIG. 6B. The control circuit 714 may be associated with a memory 716, which may be an eFUSE memory or other nonvolatile memory and is designed to store the address derived from the voltage signal sent over the cable. As noted above, there may be multiple control circuits in a PSU 404, each of which has its own address. Thus, the PSU 404 may also include a second (and more) control circuit 718 with associated memory 720.

Also, while the present disclosure is focused on a PDN and PSUs, it is possible that the managed units (e.g., the slaves) are not power supplies and/or could be located where there is no local power supply (e.g., no wall outlets), and additional wires may be present to carry a direct current (DC) power, similar to power over ethernet (POE) or other types of Class-2/Low Power System (LPS) per Underwriter Laboratory (UL) or National Electric Code (NEC) or International Electrotechnical Commission (IEC) requirements. A simple wiring topology for remote powering can be used using additional pairs of wiring. To the extent that the present disclosure could be used for managed units that are not PSUs, the present disclosure adopts the generic term "end device" to cover slave devices that are coupled to a master through a cascaded topology and may benefit from aspects of the present addressing disclosure. It should be appreciated that "end device" is generic so as to cover the PSUs described herein as well as non-power-supply-managed devices.

Figure 8:
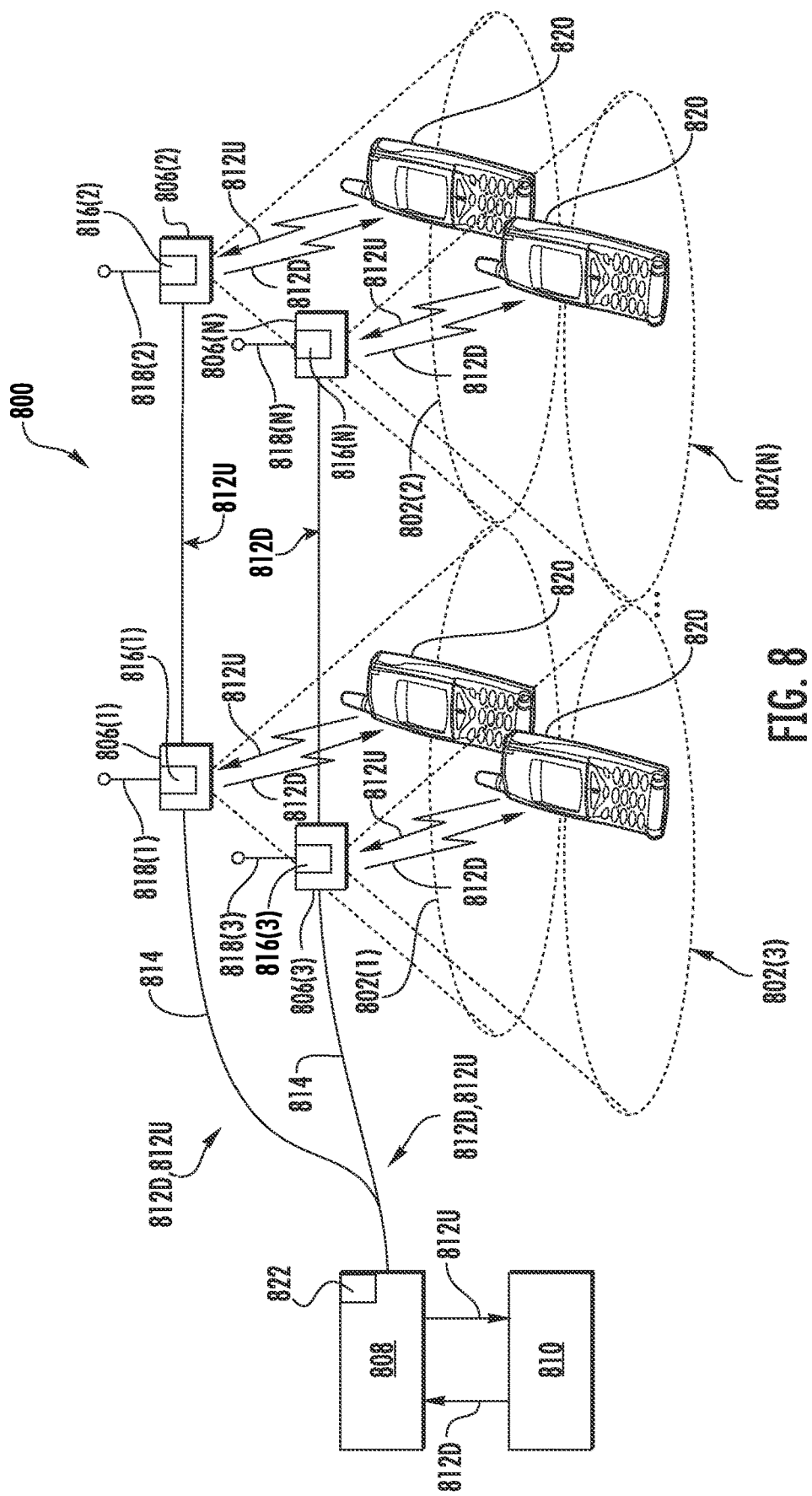
FIG. 8 is stylized representation of a DCS that may include the PDN using the addressing processes of the present disclosure.

As indicated above, the present disclosure is well suited for use in a PDN that may be associated with a variety of other systems such as a DAS. More details about a DAS are provided herein in the interests of completeness. Thus, FIG. 8 illustrates a DAS 800 in operation and configured to distribute communication services to remote coverage areas 802(1)-802(N). The DAS 800 can be configured to support a variety of communication services that can include cellular communication services, wireless communication services, such as RF identification (RFID) tracking, Wireless Fidelity (WiFi), local area network (LAN), and wireless LAN (WLAN), wireless solutions (Bluetooth, WiFi Global Positioning System (GPS) signal-based, and others) for location-based services, and combinations thereof, as examples. The remote coverage areas 802(1)-802(N) are created by and centered on remote units (RUs) 806(1)-806(N) connected to a central unit, which may be a head end unit 808, which may include a transceiver 822. The head end unit 808 may be communicatively coupled to a component of a radio frequency (RF) service 810, such as, for example, a base transceiver station (BTS) or a baseband unit (BBU). In this regard, the head end unit 808 receives downlink communication signals 812D from the RF service 810 to be distributed to the RUs 806(1)-806(N). The downlink communication signals 812D can include data communication signals and/or communication signaling signals as examples. The head end unit 808 may be configured with filtering circuits and/or other signal processing circuits that are configured to support a specific number of communication services in a particular frequency bandwidth (i.e., frequency communi-cation bands). The downlink communication signals 812D are communicated by the head end unit 808 to the RUs 806(1)-806(N).

With continuing reference to FIG. 8, the RUs 806(1)-806(N) are configured to receive the downlink communication signals 812D from the head end unit 808. The downlink communication signals 812D are configured to be distributed to the respective remote coverage areas 802(1)-802(N) of the RUs 806(1)-806(N). The RUs 806(1)-806(N) are also configured with filters and other signal processing circuits that are configured to support all or a subset of the specific communication services (i.e., frequency communication bands) supported by the head end unit 808. Each of the RUs 806(1)-806(N) may include a respective RF transmitter/receiver 816(1)-816(N) and a respective antenna 818(1)-818(N) operably connected to the RF transmitter/receiver to distribute wirelessly the communication services to user equipment (UE) 820 within the respective remote coverage areas 802(1)-802(N). The RUs 806(1)-806(N) are also configured to receive uplink communication signals 812U from the UE 820 in the respective remote coverage areas 802(1)-802(N) to be distributed to the RF service 810.

Figure 9:
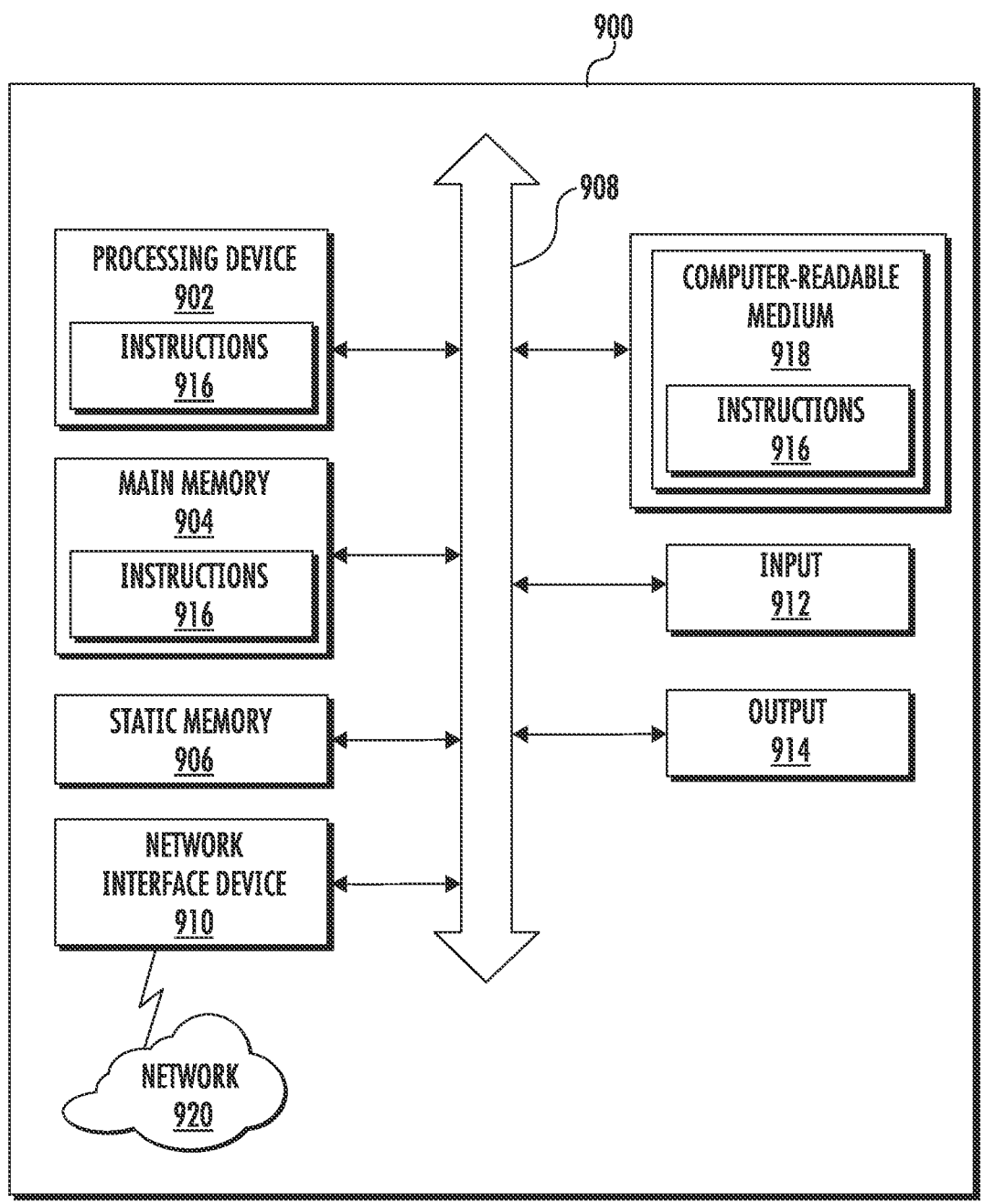
FIG. 9 is a block diagram of a computing device that may be used in the PDN of FIG. 4.

More generically, the PSU 404 and/or the master controller 402 may be a computer or include a computer system 900, such as that shown in FIG. 9, to carry out their functions and operations. With reference to FIG. 9, the computer system 900 includes a set of instructions for causing the multi-operator radio node component(s) to provide its designed functionality and the circuits discussed above. The multi-operator radio node component(s) may be connected (e.g., networked) to other machines in a LAN, an intranet, an extranet, or the Internet. The multi-operator radio node component(s) may operate in a client-server network environment or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 900 in this embodiment includes a processing circuit or processor 902, a main memory 904 (e.g., read-only memory (ROM), flash memory, dynamic random access memory (DRAM) such as synchronous DRAM (SDRAM), etc.), and a static memory 906 (e.g., flash memory, static random access memory (SRAM), etc.), which may communicate with each other via a data bus 908. Alternatively, the processing circuit 902 may be connected to the main memory 904 and/or static memory 906 directly or via some other connectivity means. The processing circuit 902 may be a controller, and the main memory 904 or static memory 906 may be any type of memory.

The processing circuit 902 represents one or more general-purpose processing circuits such as a microprocessor, central processing unit, or the like. More particularly, the processing circuit 902 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 902 is configured to execute processing logic in instructions 916 for performing the operations and steps discussed herein.

The computer system 900 may further include a network interface device 910. The computer system 900 also may or may not include an input 912 to receive input and selections to be communicated to the computer system 900 when executing instructions 916. The computer system 900 also may or may not include an output 914, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processing circuit 902 during execution thereof by the computer system 900, the main memory 904, and the processing circuit 902 also constituting the computer-readable medium 918. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database and/or associated caches and servers) that store the one or more sets of instructions 916. The term "computer-readable medium" shall also be taken to include any medium that is capable of storing, encoding, or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read-only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modification combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A method for assigning addresses to power supply units (PSUs) in a power distribution network (PDN), comprising:
from a host, sending a voltage signal at a first voltage level to a first PSU;
at the first PSU, determining an address from the first voltage level;
from the first PSU, sending a second voltage signal at a second higher voltage level to a downstream PSU; and
at the downstream PSU, determining a second address from the second higher voltage level.

2. The method of claim 1, wherein sending the voltage signal comprises sending an analog voltage signal.

3. The method of claim 2, wherein determining the address from the first voltage level comprises using an analog-to-digital converter (ADC) on the analog voltage signal.

4. The method of claim 3, wherein sending the second voltage signal comprises increasing a value of the first voltage level in a digital domain and converting to an analog voltage signal with a digital to analog converter (DAC).

5. The method of claim 1, wherein sending the second voltage signal comprises incrementing the first voltage level by at least 0.5 volts (V).

6. The method of claim 1, wherein at the first PSU, a third address is assigned to a control circuit in the first PSU based on a third voltage level between the first voltage level and the second higher voltage level.

7. The method of claim 1, wherein sending the voltage signal comprises sending the voltage signal on a CAT 5 cable.

8. The method of claim 7, further comprising sending communication signals on the CAT 5 cable.

9. The method of claim 1, further comprising providing power to a remote sub-unit from the first PSU.

10. The method of claim 9, wherein providing power to the remote sub-unit comprises providing power to a remote antenna unit.

11. A power supply unit (PSU) comprising:
an upstream input/output (I/O) interface;
a downstream I/O interface;
and a control circuit communicatively coupled to the upstream I/O interface and the downstream I/O interface, the control circuit configured to:
receive a first signal from the upstream I/O interface at a first voltage level;
determine an address from the first signal;
increment the voltage level of the first signal to a second voltage level corresponding to a second signal;
and send the second signal through the downstream I/O interface.

12. The PSU of claim 11, wherein the upstream I/O interface comprises at least a CAT 5 receptacle configured to receive a CAT 5 cable connector.

13. The PSU of claim 11, further comprising a memory, wherein the control circuit is configured to store the address in the memory.

14. The PSU of claim 11, further comprising an analog-to-digital converter (ADC) configured to convert the first signal from an analog voltage level to a digital value.

15. The PSU of claim 11, wherein the first signal is a digital signal.

16. The PSU of claim 11, further comprising a second control circuit configured to derive a second address from an incremented value of the first signal.

17. The PSU of claim 11, wherein the control circuit is further configured to receive communication signals through the upstream I/O interface.

18. The PSU of claim 11, wherein the control circuit is further configured to generate an acknowledgement signal and send the acknowledgement signal through the upstream I/O interface.

19. The PSU of claim 11, further comprising a power output configured to supply power to a remote sub-unit.

20. The PSU of claim 19, wherein the remote sub-unit comprises a remote antenna unit.

21. A method for assigning addresses to end devices in a distributed network of devices, comprising:
from a host, sending a voltage signal at a first voltage level to a first end device;
at the first end device, determining an address from the first voltage level;
from the first end device, sending a second voltage signal at a second higher voltage level to a downstream end device; and
at the downstream end device, determining a second address from the second higher voltage level.

22. The method of claim 21, wherein sending the voltage signal comprises sending an analog voltage signal.

23. The method of claim 22, wherein determining the address from the first voltage level comprises using an analog-to-digital converter (ADC) on the analog voltage signal.

24. The method of claim 23, wherein sending the second voltage signal comprises increasing a value of the first voltage level in a digital domain and converting to an analog voltage signal with a digital-to-analog converter (DAC).

25. The method of claim 21, wherein sending the second voltage signal comprises incrementing the first voltage level by at least 0.5 volts (V).

26. The method of claim 21, wherein at the first end device, a third address is assigned to a control circuit in the first end device based on a third voltage level between the first voltage level and the second higher voltage level.

27. The method of claim 21, wherein sending the voltage signal comprises sending the voltage signal on a CAT 5 cable.

28. The method of claim 27, further comprising sending communication signals on the CAT 5 cable.

29. An end device comprising: an upstream input/output (I/O) interface;
a downstream I/O interface;
and a control circuit communicatively coupled to the upstream I/O interface and the downstream I/O interface, the control circuit configured to:
receive a first signal from the upstream I/O interface at a first voltage level;
determine an address from the first signal;
increment the voltage level of the first signal to a second voltage level corresponding to a second signal;
and send the second signal through the downstream I/O interface.

30. The end device of claim 29, wherein the upstream I/O interface comprises at least a CAT 5 receptacle configured to receive a CAT 5 cable connector.

31. The end device of claim 29, further comprising a memory, wherein the control circuit is configured to store the address in the memory.

32. The end device of claim 29, further comprising an analog-to-digital converter (ADC) configured to convert the first signal from an analog voltage level to a digital value.

33. The end device of claim 29, wherein the first signal is a digital signal.

34. The end device of claim 29, further comprising a second control circuit configured to derive a second address from an incremented value of the first signal.

35. The end device of claim 29, wherein the control circuit is further configured to receive communication signals through the upstream I/O interface.

36. The end device of claim 29, wherein the control circuit is further configured to generate an acknowledgement signal and send the acknowledgement signal through the upstream I/O interface.

* * * * *